(12) United States Patent
Amitai

(10) Patent No.: US 8,000,020 B2
(45) Date of Patent: Aug. 16, 2011

(54) SUBSTRATE-GUIDED IMAGING LENS

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 168 days.

(21) Appl. No.: 12/278,754

(22) PCT Filed: Feb. 8, 2007

(86) PCT No.: PCT/IL2007/000172
§ 371 (c)(1),
(2), (4) Date: Aug. 7, 2008

(87) PCT Pub. No.: WO2007/093983
PCT Pub. Date: Aug. 23, 2007

(65) Prior Publication Data
US 2009/0052047 A1 Feb. 26, 2009

(30) Foreign Application Priority Data

Feb. 14, 2006 (IL) ............................. 173715

(51) Int. Cl.
*G02B 27/14* (2006.01)
*G02B 5/00* (2006.01)
(52) U.S. Cl. ................. 359/633; 359/638; 345/7
(58) Field of Classification Search .......... 359/630, 359/631, 634, 636–640; 345/7–9
See application file for complete search history.

(56) References Cited

U.S. PATENT DOCUMENTS

| 6,704,052 | B1 | 3/2004 | Togino et al. |
| 7,163,291 | B2 | 1/2007 | Cado et al. |
| 2003/0165017 | A1 | 9/2003 | Amitai |
| 2004/0136082 | A1 | 7/2004 | Cado et al. |

FOREIGN PATENT DOCUMENTS

| WO | WO 02/088825 | 11/2002 |
| WO | WO 2004/053541 | 6/2004 |

*Primary Examiner* — Alicia M Harrington

(57) ABSTRACT

There is provided an optical system, including a substrate having a major surface and edges, an optical element for coupling light into the substrate by total internal reflection, a reflecting surface carried by the substrate, a retardation plate and a reflecting optical element. The retardation plate is located between a portion of the major surface of the substrate and the reflecting optical element.

36 Claims, 15 Drawing Sheets

SUBSTRATE-GUIDED IMAGING LENS

FIELD OF THE INVENTION

The present invention relates to substrate-guided optical systems, and in particular, to optical systems which include an arrangement of an reflecting optical element, a retardation plate and reflecting surfaces carried by a common light-transmissive substrate. Such a system is also referred to as a light-guide collimating element (LCE).

The invention can be implemented to advantage in a large number of imaging applications, such as head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays wherein an optical module serves both as an reflecting optical element and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier, bulkier, and therefore, even for a moderate performance device, is impractical. This is a major drawback for all kinds of displays but especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even to small movements of the optical system relative to the eye of the viewer, and does not allow sufficient pupil motion for comfortable reading of text from such displays.

The teachings included in the publications WO 01/95027, WO 2006/013565, WO 2006/085309, WO 2006/085310 and PCT/IL2006/001278 in the name of Applicant, are herein incorporated by references.

DISCLOSURE OF THE INVENTION

The present invention facilitates the design and fabrication of very compact imaging device for, amongst other applications, head-mounted displays (HMDs).

The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation tasks. Nevertheless, state-of-the-art HUDs suffer several significant drawbacks. All HUDs of the current designs require a display light source that must be offset a significant distance from the combiner to ensure that the source illuminates the entire combiner surface. As a result, the combiner-projector HUD system is necessarily bulky, large and requires considerable installation space, which makes it inconvenient for installation and at times even unsafe to use. The large optical aperture of conventional HUDs also poses a significant optical design challenge, either rendering the HUDs with compromising performance, or leading to high cost wherever high-performance is required. The chromatic dispersion of high-quality holographic HUDs is of particular concern.

A broad object of the present invention is therefore to alleviate the drawbacks of state-of-the-art compact optical display devices and to provide other optical components and systems having improved performance, according to specific requirements.

A further object of the present invention relates to its implementation in a compact HUD, alleviating the aforementioned drawbacks. In the HUD design of the current invention, the combiner is illuminated with a compact display light source that can be attached to the substrate. Hence, the overall system is very compact and can be readily installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A still further object of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby, the present invention enables the viewing of the digital content of a full format internet page within a small, hand-held device, such as a cellular phone, or any entertainment device.

In accordance with the invention, there is therefore provided an optical system, comprising a substrate having at least one major surface and edges, an optical element for coupling light into said substrate by total internal reflection, at least one reflecting surface carried by said substrate, and at least one retardation plate, characterized by at least one reflecting optical element, wherein said retardation plate is located between at least a portion of the major surface of the substrate and said reflecting optical element.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a diagram illustrating an optical system for collimating input light waves from a display light source, in accordance with the present invention;

FIG. 2 is a diagram illustrating a method for collimating and coupling-in input waves from a display light source into an LOE, in accordance with the present invention;

FIG. 3 is a diagram illustrating a method for collimating input light waves from a liquid crystals on silicon (LCOS) display light source, in accordance with the present invention;

FIGS. 4a, 4b and 4c are diagrams illustrating methods for collimating and expanding input waves from a display light source, in accordance with the present invention;

FIG. 5 is a diagram illustrating a method for collimating input light waves from a display light source by utilizing a field lens and a collimating lens, in accordance with the present invention;

FIG. 6 is a diagram illustrating a method for collimating input light waves from a display light source by utilizing two lenses, in accordance with the present invention;

FIG. 7 is a diagram illustrating a method for collimating input light waves from an LCOS display light source by utilizing two lenses, in accordance with the present invention;

FIGS. 8a and 8b are diagrams illustrating methods for collimating input light waves from (a) an LCD and (b) an LCOS display light sources by utilizing three lenses, in accordance with the present invention;

FIG. 9 is a diagram illustrating a method for collimating and coupling-in input waves from an LCOS display light source into an LOE utilizing two lenses, in accordance with the present invention;

FIG. 10 is a graph illustrating the optical performance of a prior art collimating lens;

FIG. 11 is a graph illustrating the optical performance of a collimating lens, in accordance with the present invention;

Figure 12:
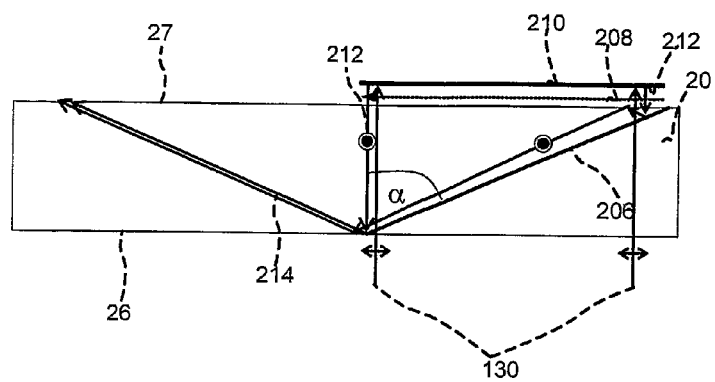
Figure 13:
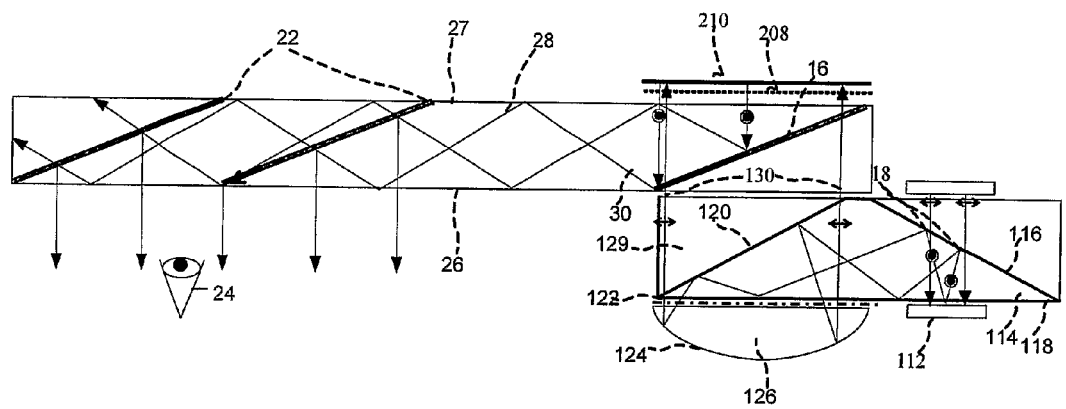
Figure 14:
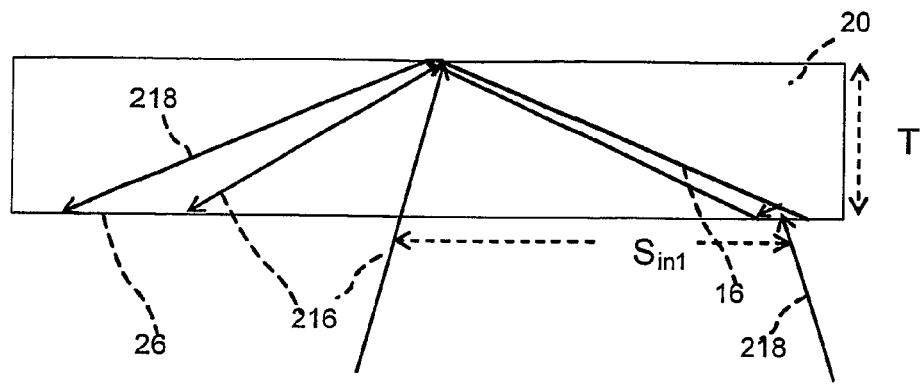
Figure 15:
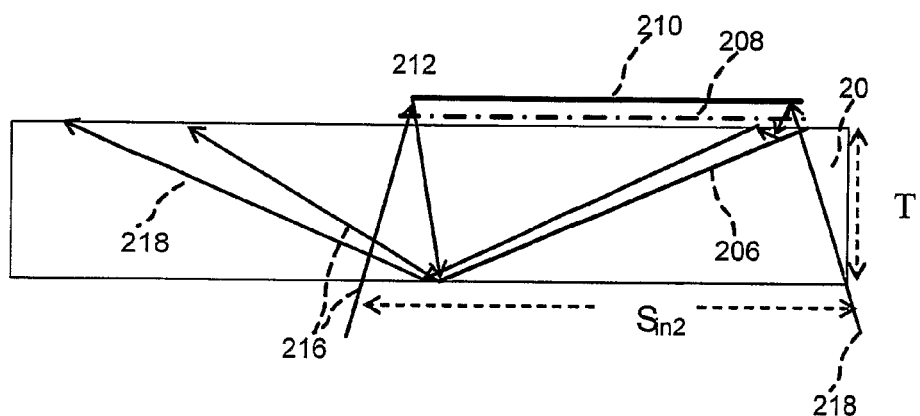
Figure 16:
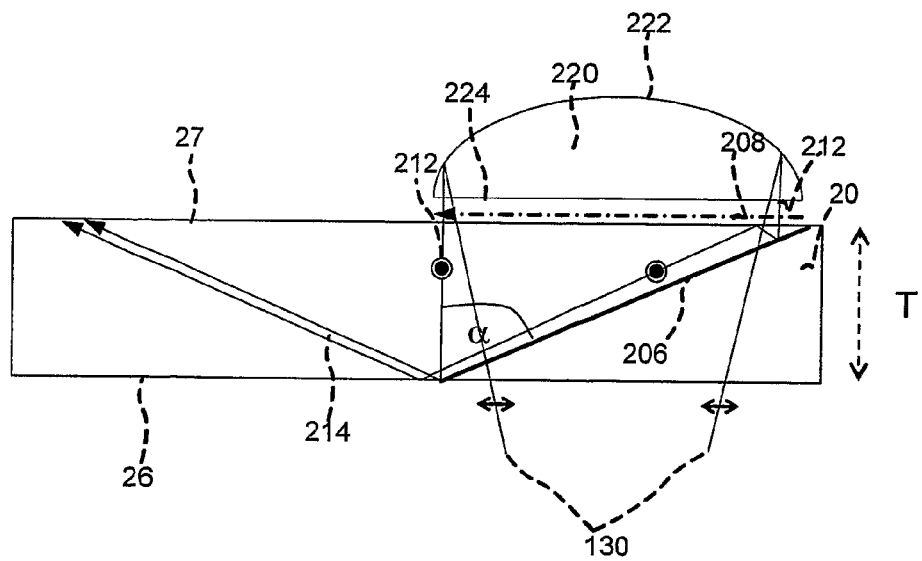
Figure 17:
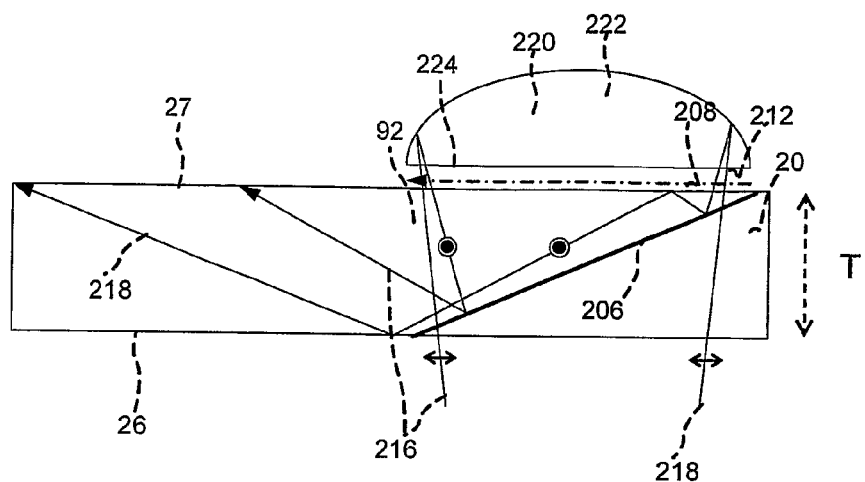
Figure 18:
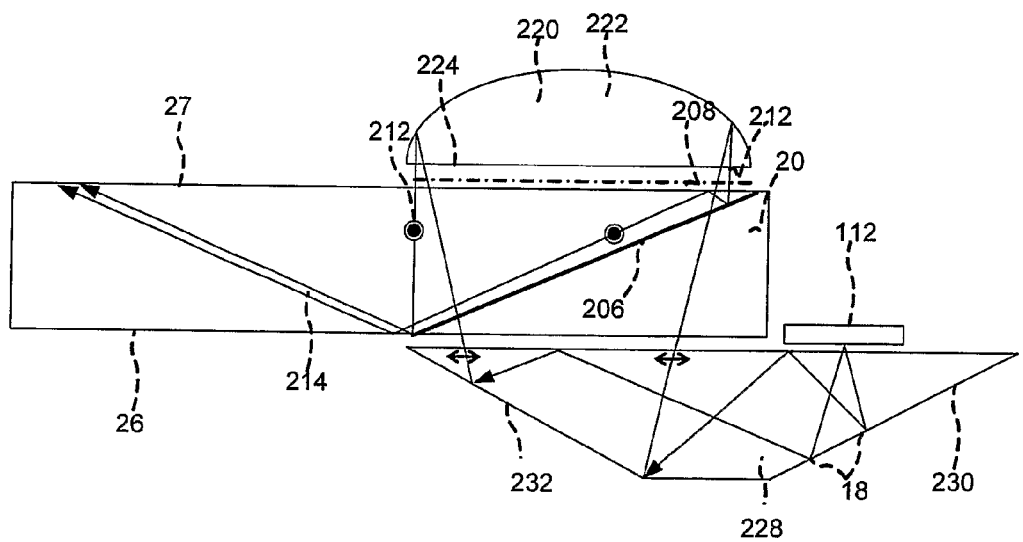
Figure 19:
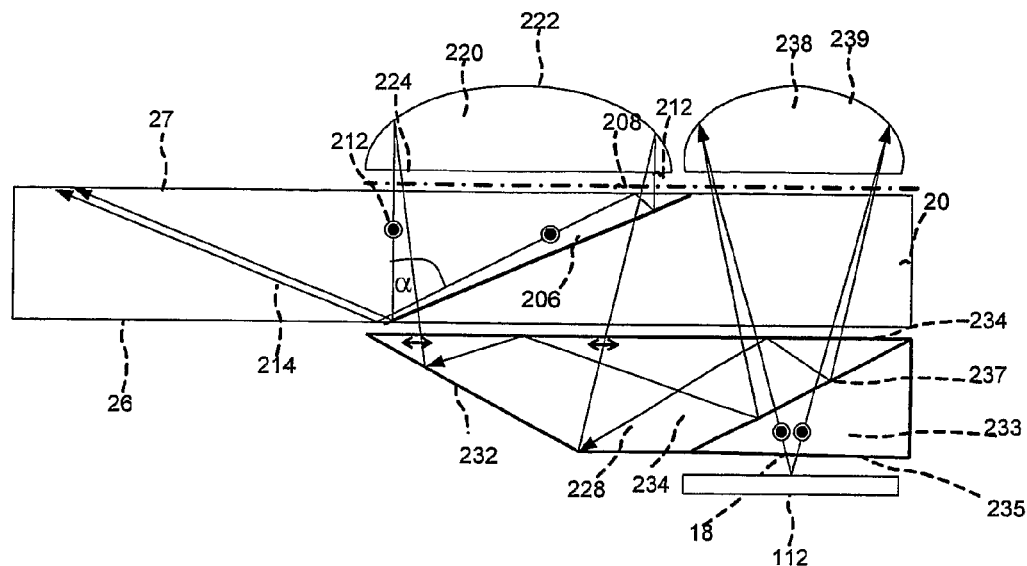
Figure 20:
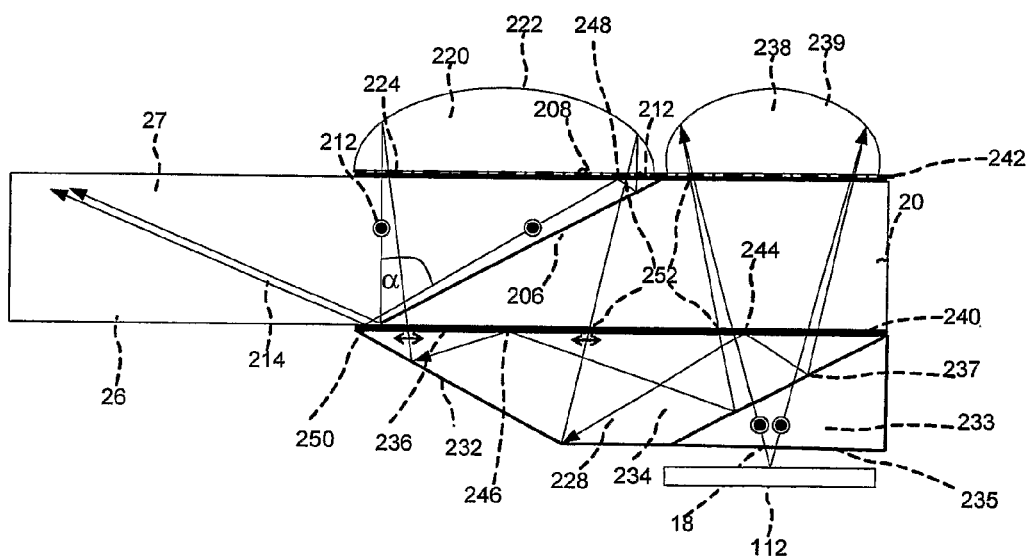
Figure 21:
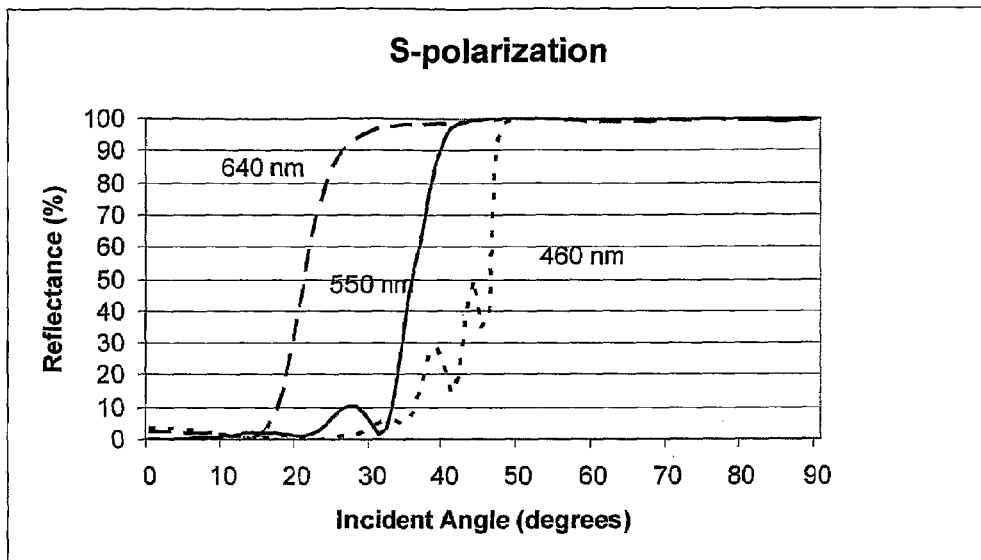
Figure 22:
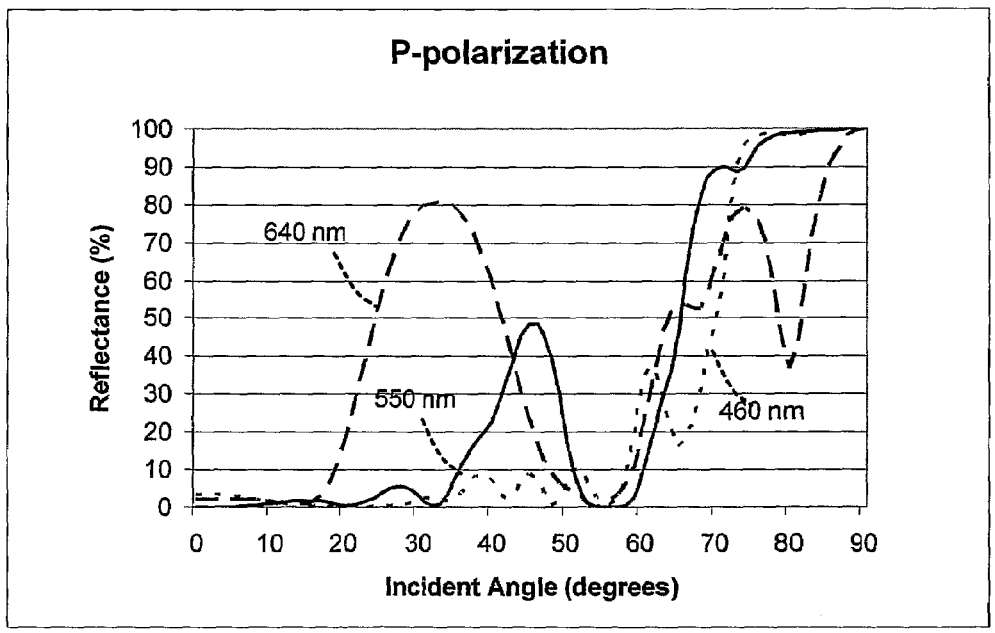
Figure 23A:
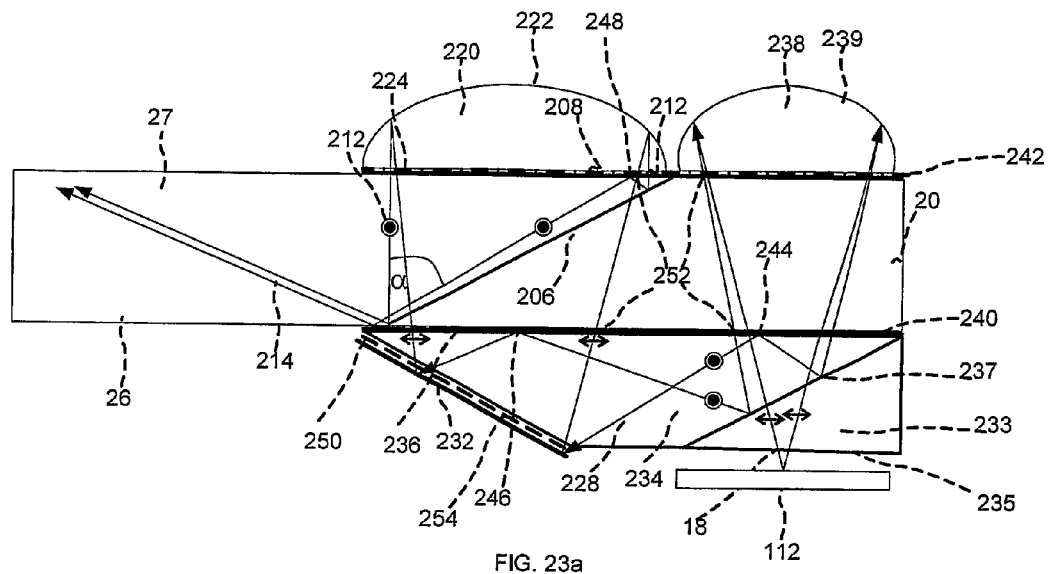
Figure 23B:
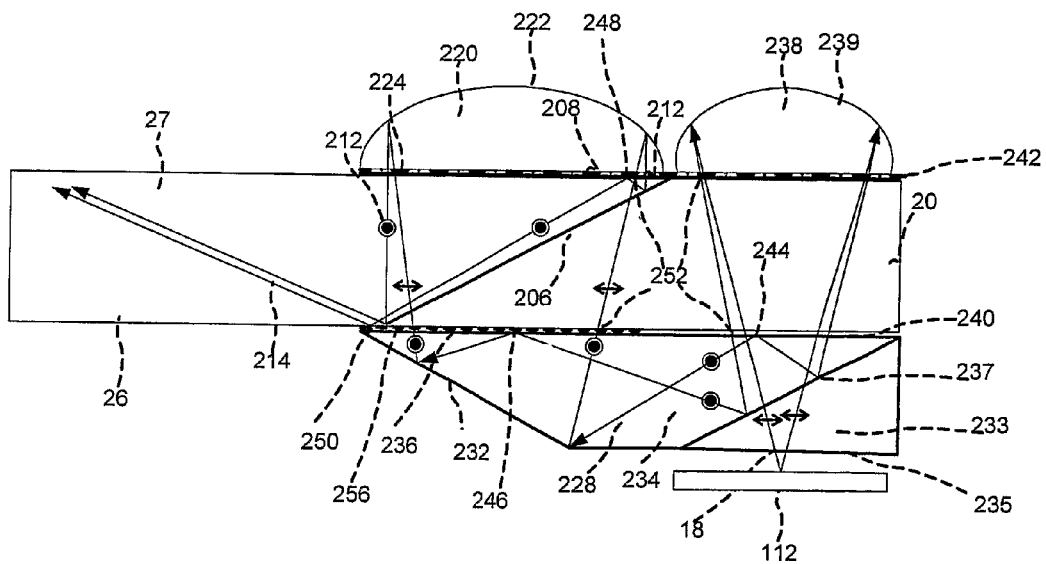
Figure 24:
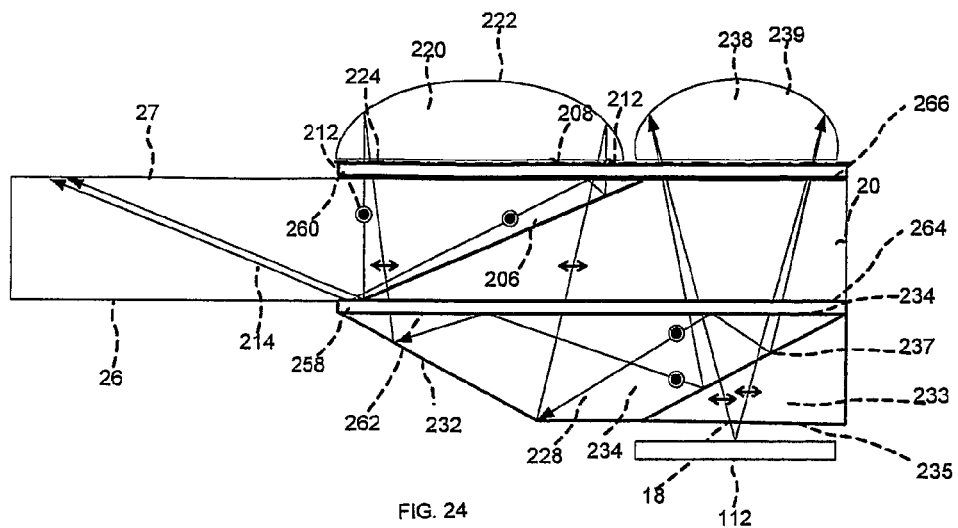
Figure 25:
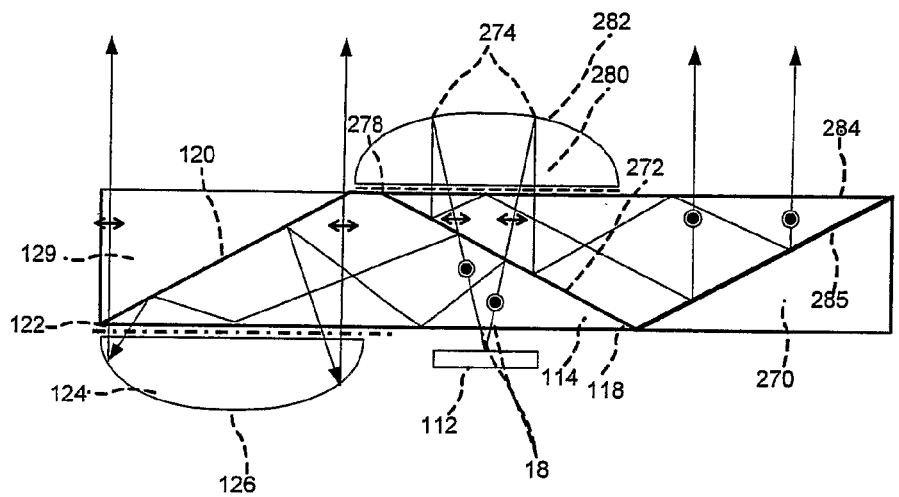
Figure 26:
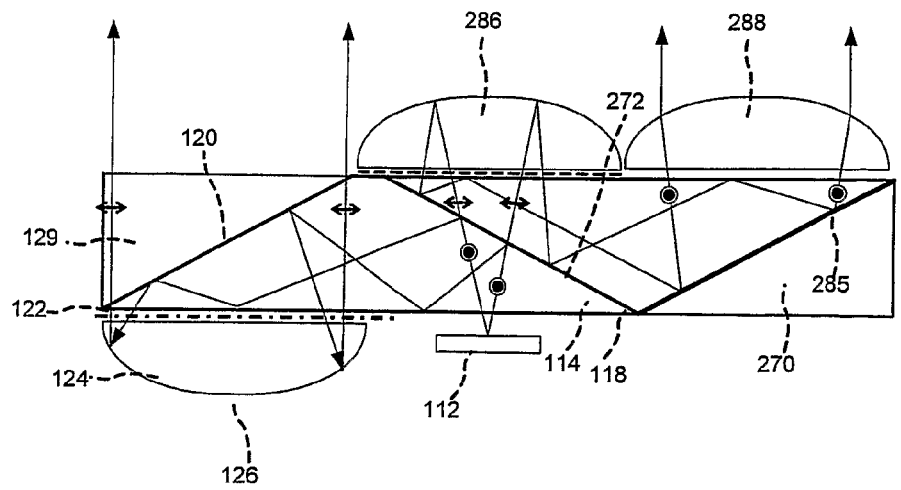
Figure 27:
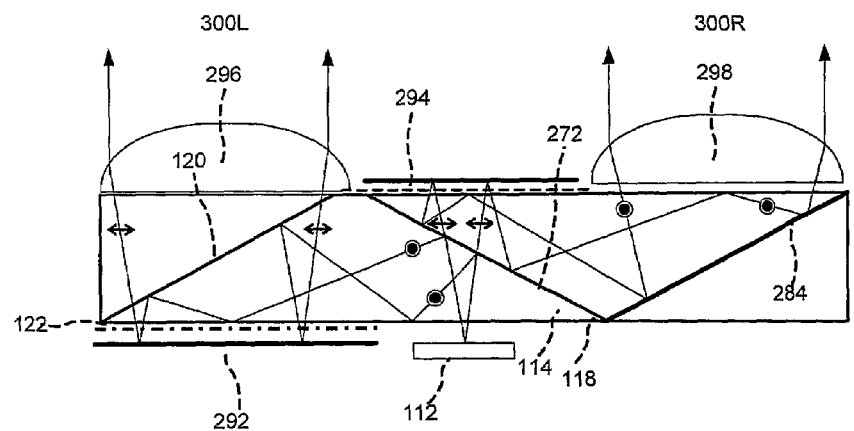
Figure 28:
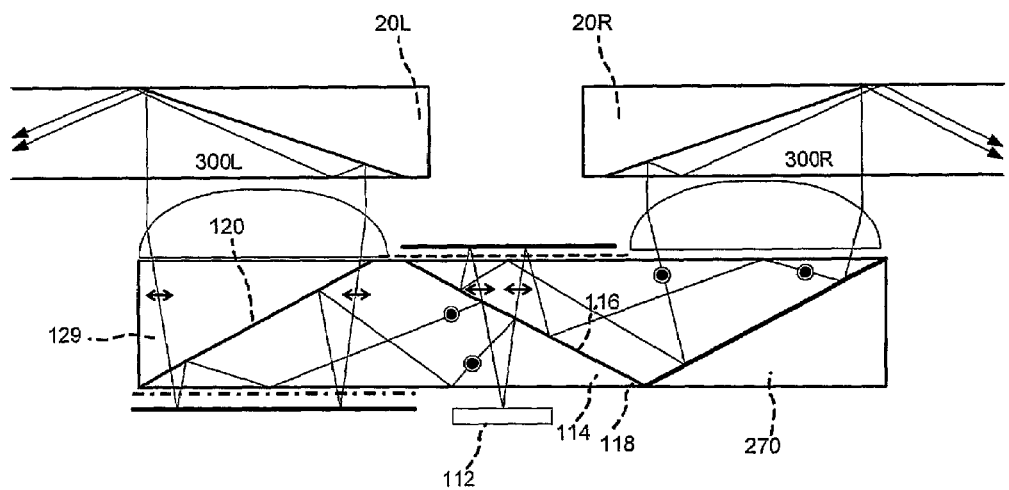
Figure 29:
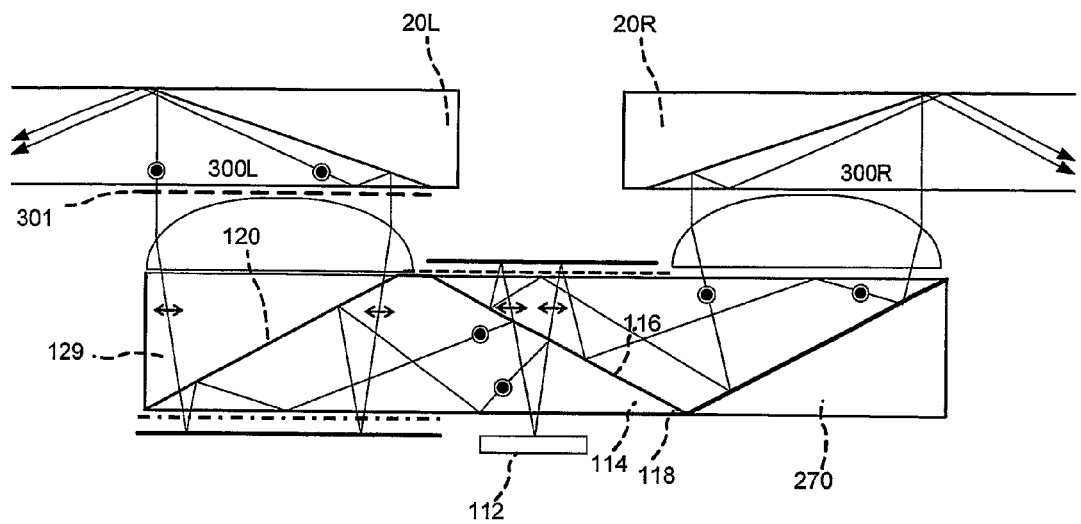
Figure 30:
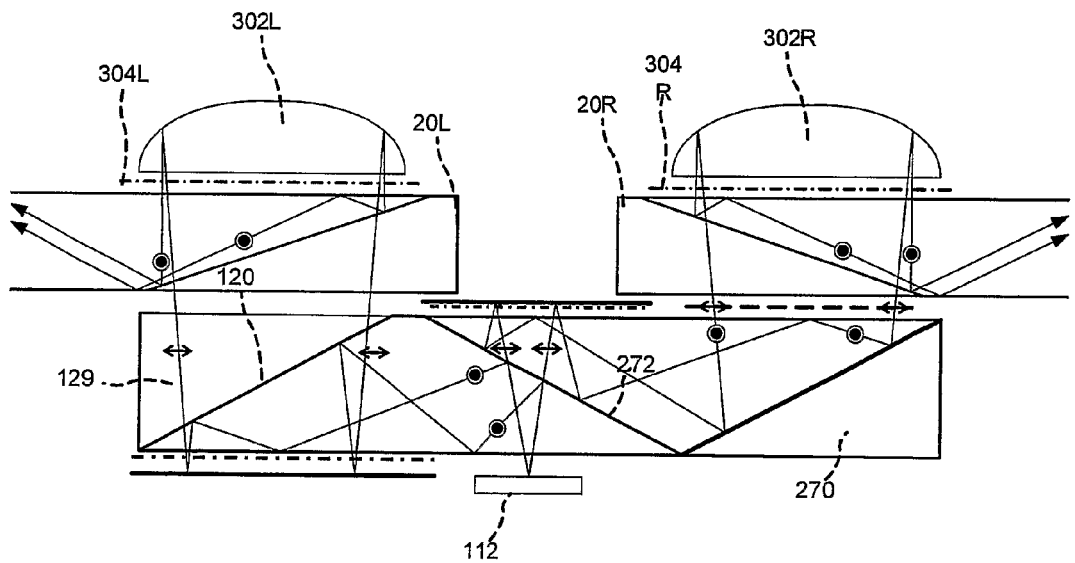
Figure 31:
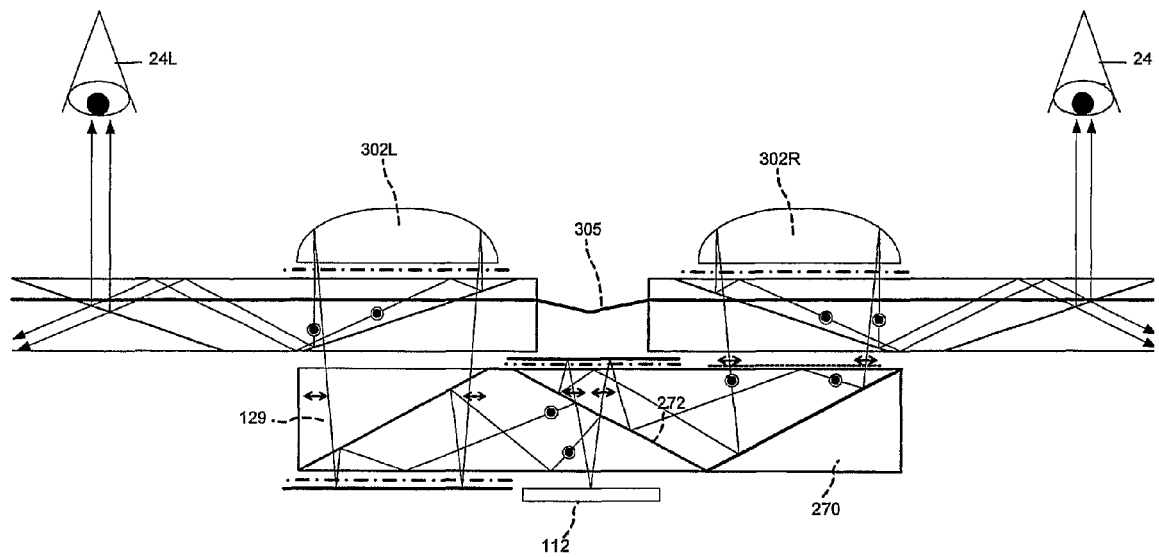
Figure 32:
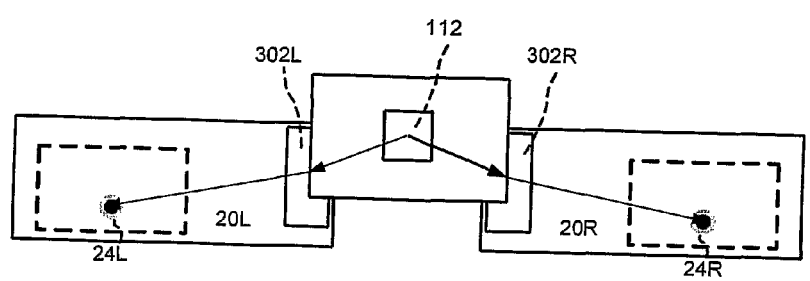
Figure 33:
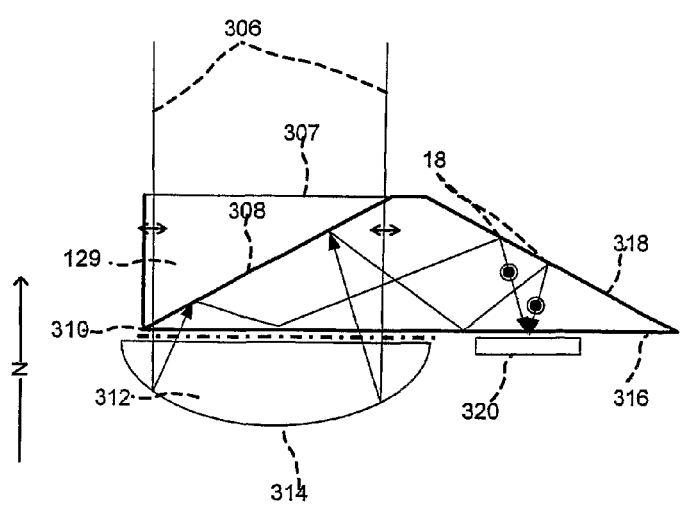

FIG. 12 is a diagram illustrating an optical system for coupling-in polarized input waves into a light-guide optical element by a coupling-in polarization-sensitive reflecting surface, in accordance with the present invention;

FIG. 13 is a diagram illustrating an optical system for collimating and coupling-in input waves from a display light source into an LOE by a coupling-in polarization-sensitive reflecting surface, in accordance with the present invention;

FIG. 14 illustrates two marginal rays which are coupled into an LOE by a coupling-in conventional reflecting surface;

FIG. 15 illustrates two marginal rays which are coupled into an LOE by a coupling-in polarization-sensitive reflecting surface, in accordance with the present invention;

FIG. 16 is a diagram illustrating another method for coupling-in input waves into an LOE which further exploits a collimating lens, in accordance with the present invention;

FIG. 17 illustrates two marginal rays which are coupled into an LOE by a coupling-in polarization-sensitive reflecting surface utilizing a collimating lens, in accordance with the present invention;

FIG. 18 is a diagram illustrating another embodiment for collimating and coupling-in input waves from a display light source into an LOE, in accordance with the present invention;

FIG. 19 is a diagram illustrating yet another embodiment for collimating and coupling-in input waves from a display light source into an LOE utilizing two lenses, in accordance with the present invention;

FIG. 20 is a diagram illustrating still a further embodiment for collimating and coupling-in input waves from a display light source into an LOE utilizing angular sensitive coating in accordance with the present invention;

FIGS. 21 and 22 are graphs illustrating the reflectance curves as a function of incident angle, for an exemplary angular sensitive coating for s- and p-polarized light waves respectively;

FIGS. 23a and 23b illustrate embodiments for collimating and coupling-in input waves from a display light source into an LOE utilizing different retardation plates, in accordance with the present invention;

FIG. 24 illustrates an embodiment for collimating and coupling-in input waves from a display light source into an LOE utilizing two transparent plates having angular sensitive coating, in accordance with the present invention;

FIG. 25 illustrates an embodiment for collimating input light waves from a single display light source into two separate images, in accordance with the present invention;

FIG. 26 illustrates another embodiment for collimating input light waves from a single display light source into two separate images, in accordance with the present invention;

FIG. 27 illustrates yet another embodiment for collimating input light waves from a single display light source into two separate images, in accordance with the present invention;

FIG. 28 illustrates an optical system for collimating and coupling-in input waves from a display light source into two separate LOEs, in accordance with the present invention;

FIG. 29 illustrates another optical system for collimating and coupling-in input waves having uniform polarization, from a display light source into two separate light-guide optical elements, in accordance with the present invention;

FIG. 30 illustrates yet another system for collimating and coupling-in input waves having uniform polarization, from a display light source into two separate light-guide optical elements, in accordance with the present invention;

FIG. 31 illustrates an embodiment of a display system embedded in standard spectacles frame, in accordance with the present invention;

FIG. 32 illustrates a front view of an embodiment of a display system embedded in standard spectacles frame in accordance with the present invention, and FIG. 33 illustrates an optical system having a focusing lens, in accordance with the present invention.

DETAILED DESCRIPTION OF PREFERRED EMBODIMENTS

A superior method of designing lenses more compact than the prior art lenses having the required planar shape while still maintaining the desired optical properties of the system according to the present invention, will now be described.

Figure 1:
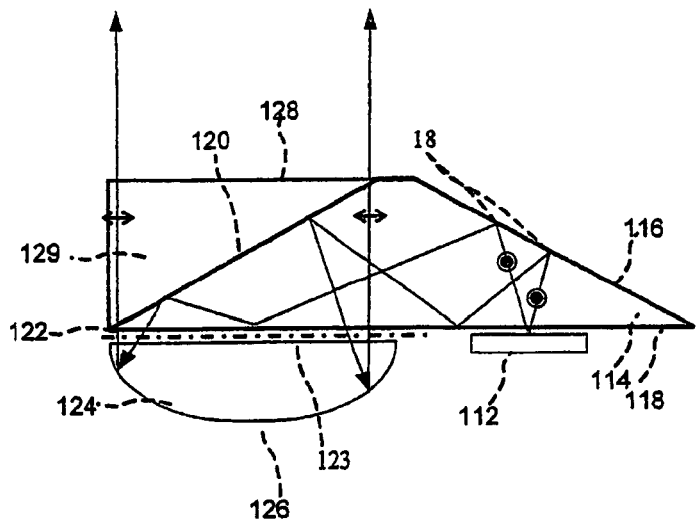

This method, which achieves these two seemingly contradictory requirements, and which exploits the fact that in most microdisplay light sources, like LCDs or LCOS, the light is linearly polarized, is illustrated in FIG. 1. As illustrated, the s-polarized input light waves 18 from the display light source 112 are coupled into the substrate 114 by the first reflecting surface 116. Following total internal reflection off the lower surface 118 of the substrate, the waves are reflected off a polarizing beamsplitter 120 and coupled out of the substrate. The waves then pass through a quarter-wavelength retardation plate 122 and a transparent surface 123, are then collimated by a reflecting optical element 124, e.g., a lens, at its reflecting surface 126, returned to pass through the retardation plate 122 again, and re-enter the substrate 114 through the lower surface 118. The now p-polarized light waves pass through the polarizing beamsplitter 120 and exit the substrate through the upper surface 128.

Figure 2:
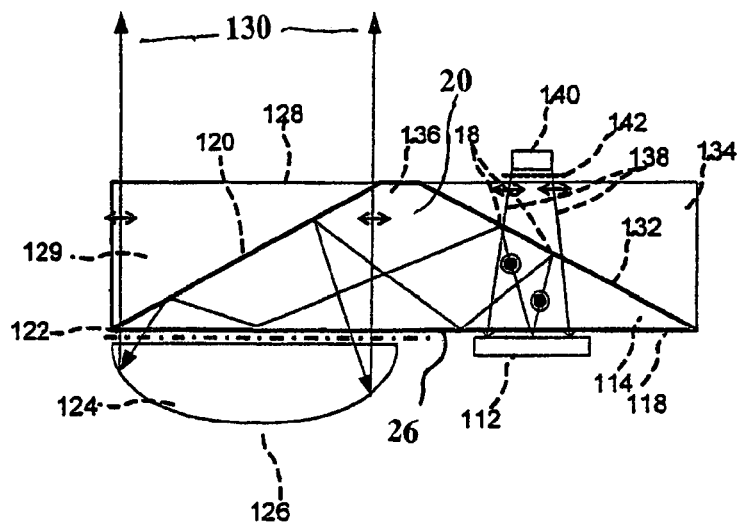

FIG. 2 illustrates how the LCE 129 can be combined with a light-guide optical element (LOE) 20 to form the required optical system. Such an LOE typically includes at least two major surfaces and edges, at least one partially reflecting surface and an optical element for coupling light thereinto. The output waves 130 from the LCE 129 enter the LOE through its lower surface 26. The incoming waves (vis-à-vis the LOE) are reflected from the surface 16 and trapped in the LOE in the same manner as that illustrated in FIG. 2. Now, the LCE 129, comprising the display light source 112, the folding prism 114, the retardation plate 122 and the collimating reflecting optical element 124 can easily be integrated into a single mechanical module which can be assembled independently of the LOE, with fairly relaxed mechanical tolerances. In addition, the retardation plate 122 and the collimating reflecting optical element 124 could be cemented together to form a single element. Alternatively, other methods could be used to combine these into a single element, such as laminating a quarter-wavelength film onto the front surface of the reflecting reflecting optical element 124.

Another advantage of the proposed imaging method illustrated here manifests itself when utilizing an LCOS device as the display light source. Like LCD panels, LCOS panels contain two-dimensional array of cells filled with liquid crystals that twist and align in response to control voltages. With LCOS, however, the liquid crystal elements are grafted directly onto a reflective silicon chip. As the liquid crystals twist, the polarization of the light is either changed or unchanged following reflection of the mirrored surface below. This, together with a polarizing beam-splitter, causes modulation of the light and creates the image. In addition, the reflective technology means the illumination and imaging light beams share the same space. Both of these factors necessitate the addition of a special beam-splitting element to the optical module to in order to enable the simultaneous operations of the illuminating as well as the imaging functions. The addition of such an element would normally complicate the optical module and, when using LCOS as the display light source, some arrangements using a frontal coupling-in element or a folding prism, would become even larger. For the imaging method illustrated in FIG. 1, however, it is readily possible to add the illuminating unit to the optical module without significantly increasing the volume of the system.

Figure 3:
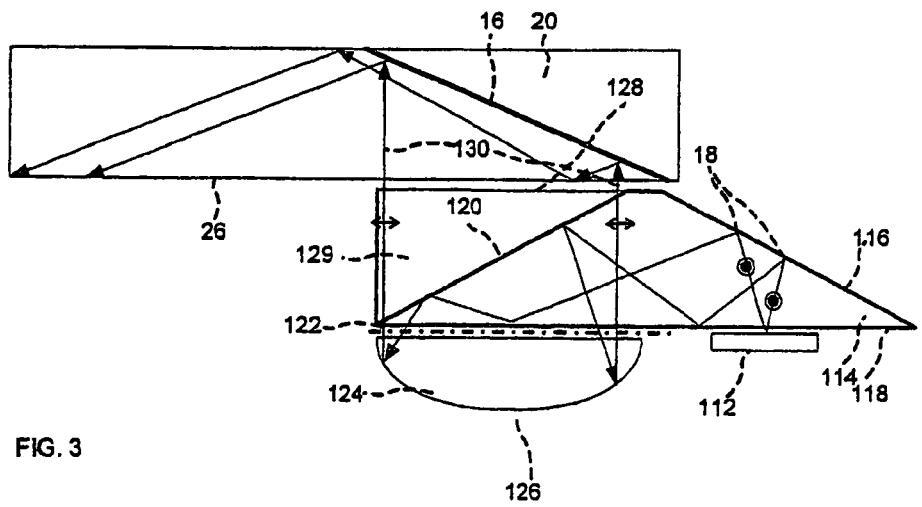

As illustrated in FIG. 3, instead of using a simple reflecting mirror, the input light waves 18 from the LCOS 112 are reflected by a polarizing beamsplitter 132. A completing prism 134 is added to the substrate 114 to form a parallelepiped 136. Here, the p-polarized light waves 138, emanating from a light source 140, pass through the polarizing beamsplitter 132 and illuminate the front surface of the LCOS 112. The polarization of the reflected light from the "light" pixels is rotated to the s-polarization and the light waves are then reflected off the beamsplitter 132 as described above in reference to FIG. 1. If the light source 140 is unpolarized, it is possible to add a polarizer 142, which transmits only the desired polarization. Evidently, the LCE 129 remains compact and it retains its planar form.

Figure 4A:
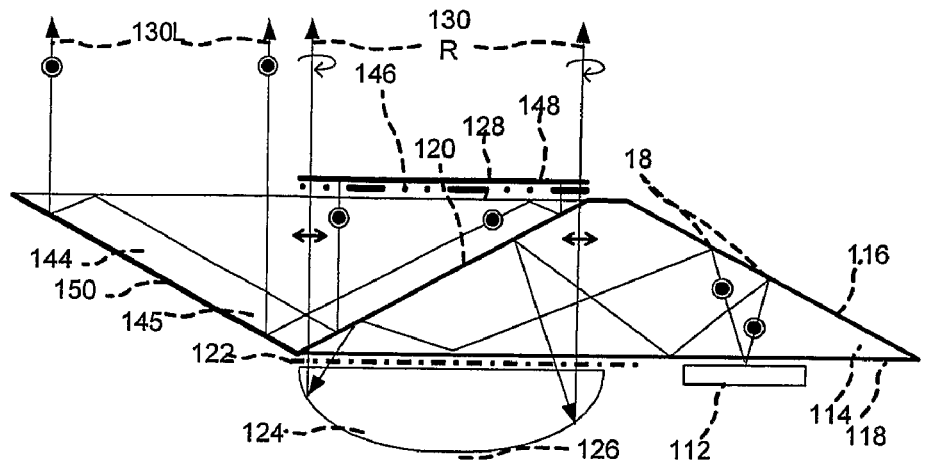
Figure 4B:
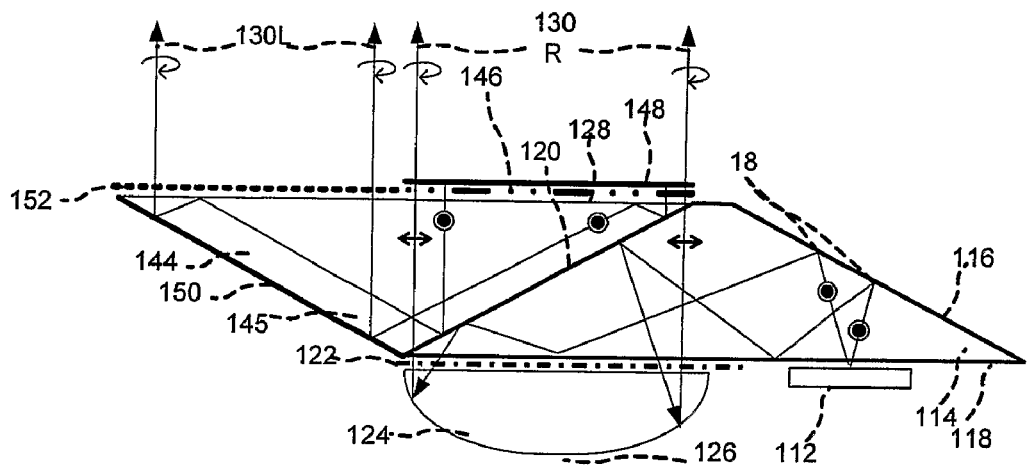
Figure 4C:
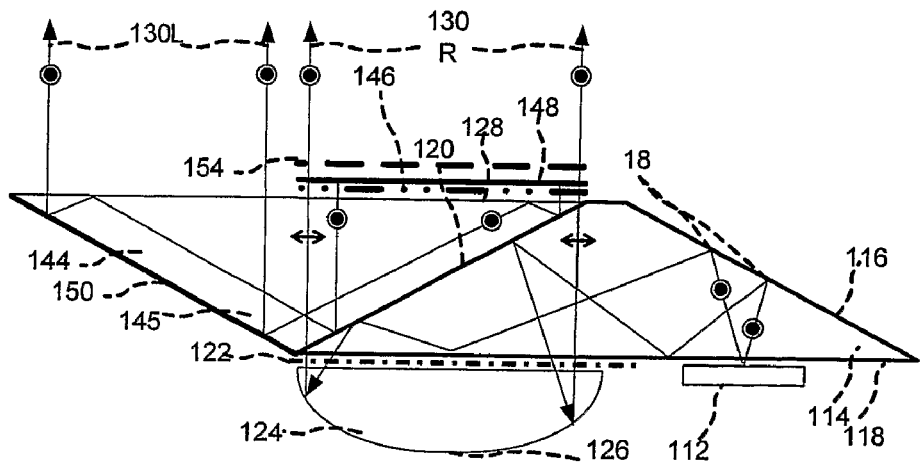

As described above, one of the major parameters determining the volume of a collimating lens is its output aperture. Usually, increasing the output aperture will increase the lens volume accordingly. FIGS. 4a, 4b and 4c, however, illustrate methods of increasing the output aperture of the LCE 129 by a factor of two by slightly increasing the lens volume. As illustrated in FIG. 4a, a completing prism 144 is added to the substrate 114 to form a parallelogram 145. The output waves 130 from the collimating reflecting optical element 124 pass through the quarter-wave-length retardation plate 146, are partially reflected by a half-reflecting surface 148, return to pass through the upper surface 128 re-entering the substrate 145. The now s-polarized light waves reflect off the polarizing beamsplitter 122. Then, following total internal reflection off the upper surface 128 of the substrate, the waves are reflected and coupled out off the reflecting surface 150. Evidently, the output aperture of the coupled-out light wave 130 is twice as large as previously illustrated in FIG. 1. One problem left to be solved is the polarization uniformity of the output light wave 130. While the right portion of the wave 130R is circularly polarized, the left portion 130L is linearly s-polarized. FIG. 4b illustrates one method to solve this non-uniformity. A quarter-wavelength retardation plate 152 is added at the left side of the output aperture, wherein the orientation of the major axis of the retardation plate 152 is rotated by 90° with respect to that of plate 146. In that case, the output light wave 130 is circularly polarized. FIG. 4c illustrates a different method wherein a quarter-wavelength retardation plate 154 is added at the right side of the output aperture, which yields a linearly s-polarized output light wave 130. In this case, the orientation of the major axis of the retardation plate 154 is parallel to that of plate 146.

In the systems illustrated in FIGS. 1 to 4c, only a single spherical converging lens is utilized. For some optical schemes that may be sufficient. For other systems with wide FOVs and large input apertures, however, better optical quality may be required. One approach to improve the optical properties of the system is to exploit either aspheric or even aspheric-diffractive lenses. Another approach is to utilize more than one reflecting optical element.

Figure 5:
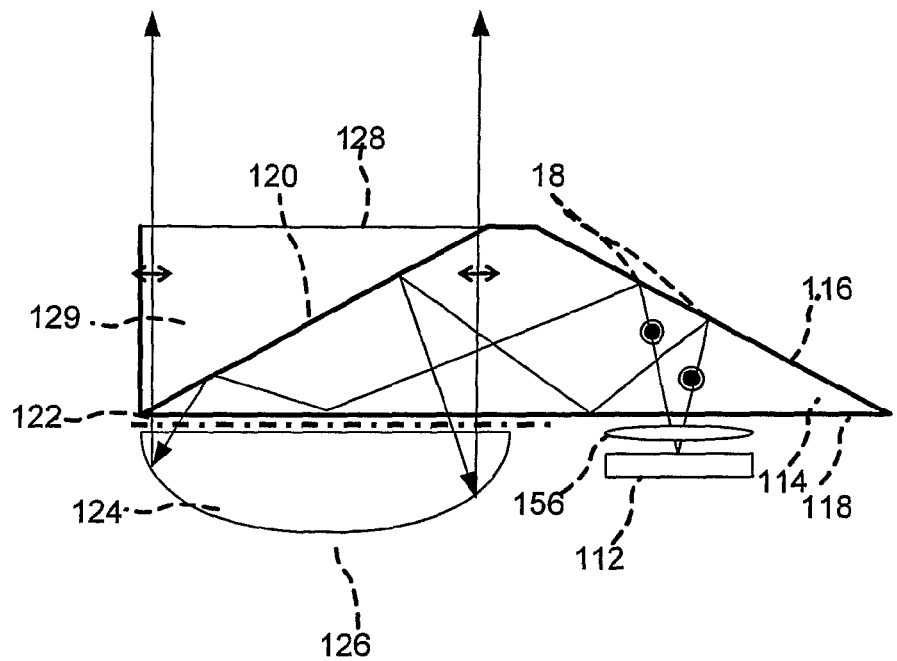

FIG. 5 illustrates an optical system wherein a field lens 156 is inserted between the display light source and the substrate 114. This lens could be utilized to correct chromatic as well as field aberrations of the optical system.

Figure 6:
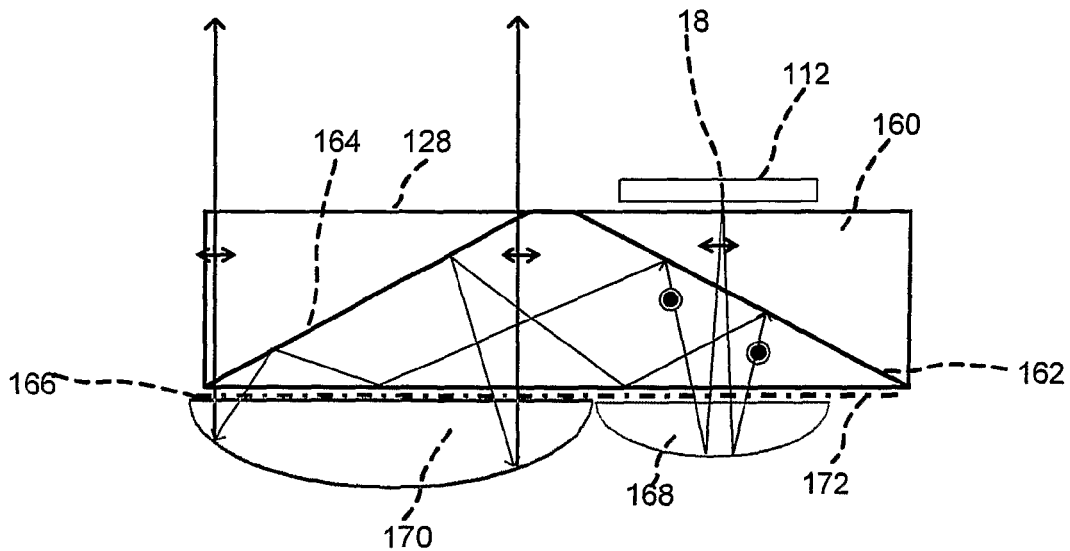

FIG. 6 illustrates an optical system utilizing a larger substrate 160 containing two embedded polarizing beamsplitters 162 and 164, a quarter-wavelength retardation plate 166 and two converging lenses 168 and 170. As illustrated, the p-polarized input light wave 18 passes through the first polarizing beamsplitter 162, is then reflected, partially converged and changed to s-polarized light by the retardation plate 166 and the first lens 168. It is then reflected off the first polarizing beamsplitter 162, the lower surface 172 of the prism and then the second polarizing beamsplitter 164. It is then reflected, fully collimated and changed back to p-polarized light by the retardation plate 166 and the second lens 170. The wave then passes through the second polarizing beamsplitter 164 and exits the substrate through the upper surface 128. The incoming wave (vis-à-vis the LOE) could now be trapped into the LOE in the same manner as that illustrated in FIG. 2. In the event where the display light source is an LCOS device, the illumination method will differ to that described above in reference to FIG. 3.

Figure 7:
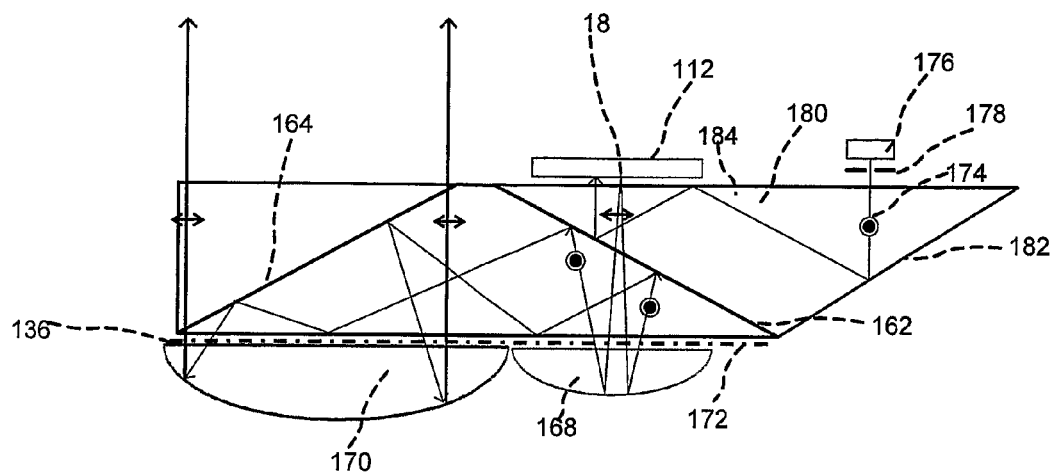

As illustrated in FIG. 7, the illuminating light waves 174 from the display light source 176 passes through an s-polarizer 178 and are coupled into the substrate 180 by the first reflecting surface 182. Following total internal reflection off the upper surface 184 of the substrate, the waves are reflected and coupled out off a polarizing beamsplitter 162 to illuminate the LCOS display light source 112. Naturally, the number of elements that could be utilized in the LCE 129 is not limited to two.

Figure 8A:
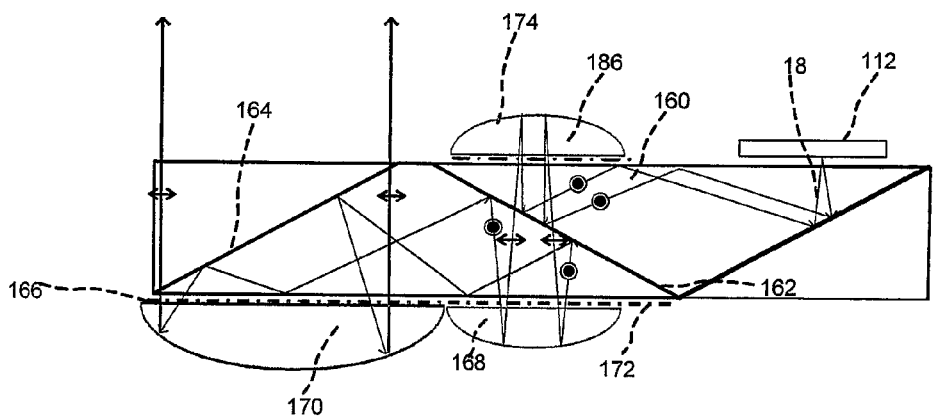
Figure 8B:
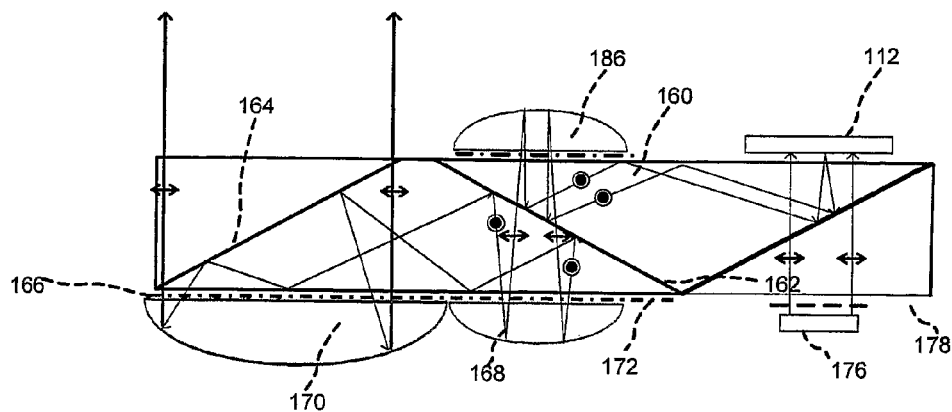

FIGS. 8a and 8b illustrate a collimating lens, having an LCD and an LCOS as the display light sources respectively, wherein a third lens 186 is added to the optical train. In general, for each specific system, the number and types of lenses in the optical collimating module will be set according to the required optical parameters, desired performance and allowed volume.

Figure 9:
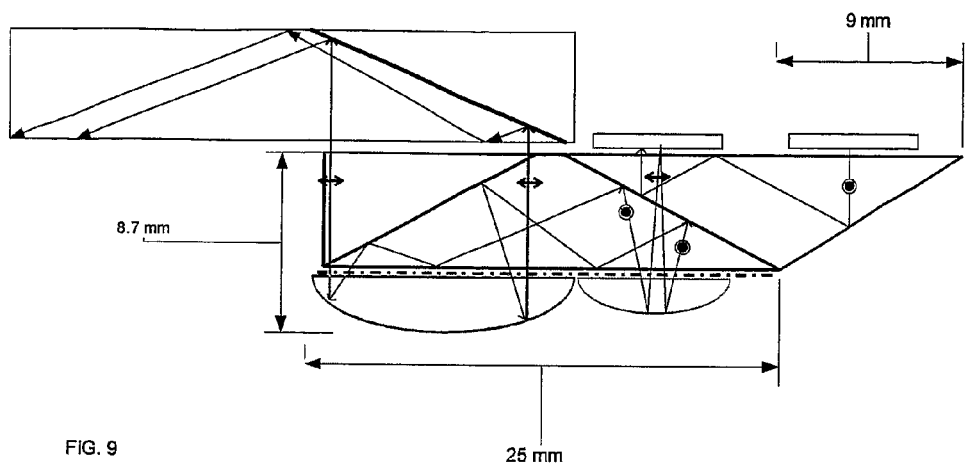

FIG. 9 illustrates the dimensions of the optical module described above with reference to FIG. 6. The optical parameters are as described above for the systems having coupling-in elements and using a folding prism, e.g., the prism illustrated in FIG. 23 of the Publication WO 2006/013565. Even though the display light source is an LCOS device, the system illustrated in FIG. 9 contains a much smaller volume than the above system.

Figure 10:
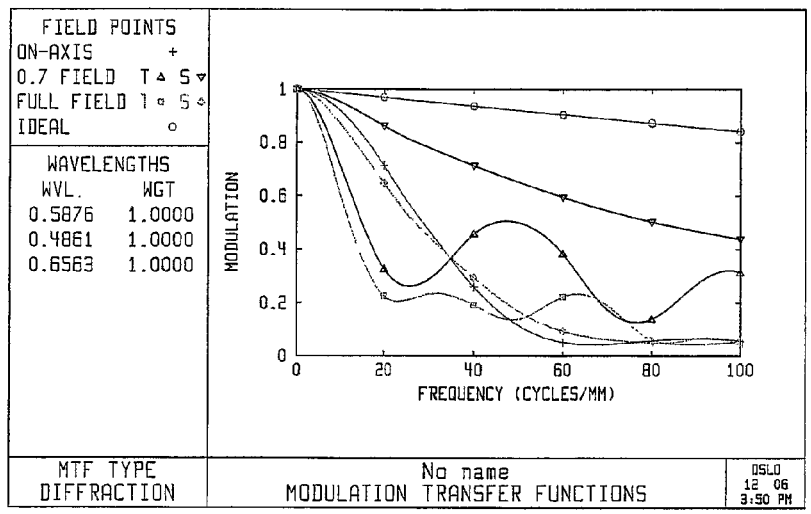
Figure 11:
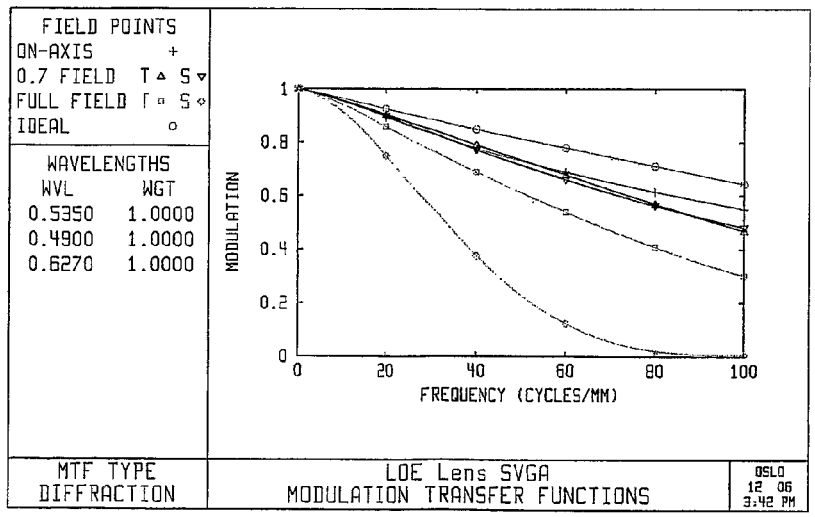

FIGS. 10 and 11 illustrate the MTF performances of the above-described systems. As illustrated, not only does e.g., the optical module contain two spherical lenses in place of the two diffractive-aspherical elements of the former systems, but is has superior performance as well.

A method wherein the input waves and the output waves are located on the same side of the substrate, exploiting the fact that in most microdisplay light sources, like LCDs or LCOSs, the light is linearly polarized, is illustrated in FIG. 12. The main difference between the embodiment illustrated here and that of the prior art, is that instead of utilizing a uniform reflecting mirror as the coupling-in element, here, a polarizing beamsplitter 206 is embedded in the LOE 20. That is, surface 206 transmits p-polarized and reflects s-polarized light. As illustrated, the input beam 130 from the LCE is p-polarized and is therefore transmitted through surfaces 206. After exiting the LOE 20 through the upper surface 27, the light beam impinges on a quarter wave retardation plate 208 converting the incoming beam into circular polarized light. The transmitted beam is then reflected back through the quarter wave plate 208 by a flat reflecting mirror 210. The reflected beam 212, now s-polarized, enters the LOE 20 through the upper surface 27 and is reflected by the polarizing beamsplitter 206. The reflected rays 214 are trapped inside the LOE 20 by total internal reflection. Clearly, the retardation plate 208 and the reflecting surface 210 could be cemented together to form a single element. Alternatively, other methods could be used to combine these into a single element, such as coating a reflecting surface on the back side of the retardation plate 208 or laminating a quarter-wavelength film on the front surface of the reflecting surface 210.

FIG. 13 illustrates the entire structure of the LOE 20 with the coupling-in mechanism described in FIG. 3. This LOE fulfils the two requirements: The input waves and the output waves are located on the same side of the substrate and the couple-in reflecting surface 16 is oriented parallel to the partially reflecting coupling-out elements 22. Hence, this structure could be implemented in eyeglasses configurations and still be fabricated using the comparatively simple procedure.

Another issue to be considered is the output aperture of the LCE 129, which is determined by the required entrance aperture of the LOE 20. FIG. 14 illustrates the aperture of a conventional LOE 20, wherein the coupling-in element is a simple reflecting mirror 16. As illustrated, the input aperture is determined by the marginal rays of the two extreme angles of the FOV of the system. The rays 216 and 218 are the left and the right marginal rays of the left and the right angles of the FOV respectively. Their intersections with the lower surface 26 of the LOE 20 determine the input aperture $S_{in1}$ of the LOE.

FIG. 15 illustrates the required input aperture for an LOE wherein the couple-in element is a polarizing beamsplitter 206 as described above with reference to FIG. 12. Since the two marginal rays 216 and 218 now have to cross an additional thickness T of the LOE before reflecting back by the surface 210, the optical path required before impinging on the coupling-in element is longer than before. Hence, the required input aperture $Sin_2$ is larger than before. The difference between $Sin_1$ and $Sin_2$ depends on the various parameters of the optical system. For example, in a system having a horizontal FOV of 24 degrees, plate thickness of 2.5 mm and refractive index of 1.51, the difference between $Sin_1$ and $Sin_2$ is 1 mm.

FIG. 16 illustrates a method of decreasing the required input aperture significantly. Instead of using the flat reflecting surface 210 of FIG. 15, a plano-convex lens 220 is placed following the retardation plate 208. Now, in order to couple collimated waves into the LOE, the waves 130 that enter the LOE through the lower surface 26 should be divergent. These divergent waves are collimated by lens 220 and by reflection off the reflective back surface 222 of the lens. They are then trapped inside the LOE in a similar manner to the method described above with reference to FIG. 12. As described before, the retardation plate 208 could be cemented to or laminated onto the front flat surface 224 of the lens 100. As illustrated in FIG. 17, the input aperture $S_{in3}$, determined by the two marginal rays 216 and 218, is now smaller than $Sin_1$. The extent to which this aperture is smaller than $Sin_1$ depends upon the optical power of the collimating lens 220. Naturally, the optical module illustrated in FIG. 15 can be regarded as a private case of the module illustrated in FIG. 16, wherein the optical power of the lens 220 is reduced to zero.

By utilizing a collimating lens instead of a flat reflecting surface, not only is a much smaller input aperture achieved, but the entire optical module can be much more compact than before as well. FIG. 18 illustrates the entire optical layout of an exemplary system utilizing the method described above. A folding prism 228 is exploited to couple the light from a display light source 112 into the LOE 20. The input waves 18 from the display light source 112 are coupled into the prism by the first reflecting surface 230 and then coupled out by the second reflecting surface 232 into the LOE, where they are collimated and trapped inside the LOE 20 in the same manner as that described above with reference to FIG. 16. Since the final converging lens is now located next to the coupled-in element 206 of the LOE 20, the optical system illustrated in FIG. 18 could be even more compact than those utilizing collimating modules illustrated above with reference to FIGS. 1 to 8b.

Similarly to that described above with reference to FIGS. 5 to 8b, here also, the number of elements that could be utilized in the collimating module is not limited to one. FIG. 19 illustrates a collimating module, wherein a second lens is added to the optical train. Here, a completing prism 233 is added to the substrate 228 wherein the two major surfaces 234 and 235 of the combined substrate 236 are parallel. Also, instead of using a simple reflecting mirror, a wire-grid polarizing beamsplitter 237 is embedded between substrate 228 and prism 233, wherein the major axis of the grid is rotated by 90° compared to that of FIG. 1. That is, the polarizing beamsplitter is oriented to reflect the p-polarization and transmit the s-polarization here. As illustrated, the s-polarized input wave 18 passes through the first polarizing beamsplitter 237 and through the right portion of the LOE 20. It is then reflected, partially converged and changed to p-polarized light by the retardation plate 208 and the first lens 238 having a reflective back surface 239. It is then reflected by the first polarizing beamsplitter 237, the upper surface 234 of the prism and then by the second polarizing beamsplitter 232. It then passes through the polarizing beamsplitter 206, is then reflected, fully collimated and changed back to s-polarized light by the retardation plate 208 and the second lens 220. The wave is then trapped in the LOE in the same manner as that described above with reference to FIG. 16.

As described above with reference to FIG. 1, also in the configuration illustrated in FIG. 19 the retardation plate 208 and front surface of the reflecting lenses 220 and 238 could be cemented together to form a single element. It would be advantageous, however, to cement all the various components of the LCE together, namely, the substrate 234, the retardation plate 208 and the lenses 220 and 238, to the LOE 20, to form a single compact element with a much simpler mechanical module.

FIG. 20 illustrates a module wherein the upper surface 234 of the substrate 236 is cemented, at the interface plane 240, to the lower surface 26 of the LOE 20, and wherein the retardation plate 208, which has been already cemented to lenses 220 and 238, is cemented at the interface plane 242 to the upper surface 27 of the LOE 20 as well. The main problem of the proposed configuration is that the cementing procedure cancels the previously existing air gaps between the LOE 20 and the substrate 234 and the retardation plate 208. These air gaps are essential for the trapping of the input waves 18 inside the substrate 234 and the output waves 212 inside the LOE 20. As illustrated in FIG. 20, the trapped light waves 18 should be reflected at the points 244 and 246 from the interface plane 240 and the trapped light waves 212 should be reflected at the points 248 and 250 from the interface plane 242. Therefore, a proper reflecting coating should be applied at these planes, either at the major surfaces 26 and 27 of the LOE 20 or at the upper surface 236 of the substrate 236 and the retardation plate 208. A simple reflecting coating, however, cannot be easily applied, since these surfaces should also be transparent to the light waves that enter and exit the LOE 20 at the exemplary points 252. The light waves should pass through the planes 240 and 242 at small incident angles, and reflect at higher incident angles. In the example illustrated, the passing incident angles are between 0° and 15° and the reflecting incident angles are between 50° and 80°.

FIGS. 21 and 22 illustrates, for s and p-polarization respectively, the reflectance curves as functions of the incident angles for three representative wavelengths in the photopic region: 460 nm, 550 nm and 640 nm. As illustrated in FIG. 21, it is possible to achieve the required behavior of high reflectance (above 95%) at large incident angles and low reflectance (below 5%) at small incident angles, for s-polarized light waves. For p-polarized light however, as illustrated in FIG. 22, it is impossible to achieve high reflectance at incident angles between 50° and 70° due to the proximity to the Brewster angle.

FIGS. 23a and 23b illustrate two methods of overcoming this problem. For both methods the light waves from the display light source are linearly p-polarized and the major axis of the grid is rotated by 90° compared to that of FIGS. 19 and 20. That is, the polarizing beamsplitter is oriented here to reflect the s-polarization and transmit the p-polarization. Now the reflected waves which impinge on the points 244 and 246 are s-polarized and the required reflectance could be achieved. FIG. 23a illustrates a method wherein a quarter-wavelength retardation plate 254 is inserted between the reflecting surface 232 and the substrate 236. Here, when passing through plate 254 twice and reflected from the surface 232, the polarization of the light wave is rotated and the now p-polarized light waves are coupled into the LOE 20 in the same manner as that described above in reference to FIG. 19. FIG. 23b illustrates a method wherein a half-wavelength retardation plate 256 is inserted between the upper surface 234 of the substrate 236 and the lower surface 26 of the LOE 20. Here, when passing through the plate 256 the polarization of the light wave is rotated and the now p-polarized light waves are coupled into the LOE.

A difficulty still existing in the configurations illustrated in FIGS. 23a and 23b is that the LOE, as well as the substrate 236, are assembled from several different components. Since the fabrication process usually involves cementing optical elements, and since the required angular-sensitive reflecting coating is applied to the substrate surface only after the bodies of the LOE 20 and the substrate 234 are complete, it is not possible to utilize the conventional hot-coating procedures that may damage the cemented areas. Novel thin-film technologies, as well as ion-assisted coating procedures, can also be used for cold processing. Eliminating the need to heat parts allows cemented parts to be coated safely. An alternative method is illustrated in FIG. 24. Here, transparent plates 258 and 260 are placed at the interface planes 240 and 242 respectively. Now, the required coating can simply be applied to the outer surfaces of these substrates, utilizing conventional hot-coating procedures and then cementing it at the proper places. For the lower substrate 258 it is possible to apply the coating at the lower surface 262, the upper surface 264 or even at both surfaces. For the upper substrate 260 the preferred surface is lower one 266, which is adjacent to the LOE.

Hitherto, it was assumed that the display light source is linearly polarized. There are however optical systems, like OLED, wherein the display light source is unpolarized and where maximal possible efficiency is important. In these cases, it is possible to spilt the input light waves from the display light source into two separate images.

FIG. 25 illustrates an optical device wherein a second LCE 270 is attached to the LCE 129 which is illustrated in FIG. 1. Instead of using a simple reflecting mirror 116, a wire-grid polarizing beamsplitter 272 is embedded between the LCEs 129 and 270. As illustrated, while the s-polarized input light waves are reflected and collimated in the same manner as described above with reference to FIG. 1, the p-polarized input wave 274 passes through the first polarizing beamsplitter 272, is then reflected, converged and changed to s-polarized light by the retardation plate 278 and a second converging lens 280 having a reflective back surface 282. It is then reflected by the first polarizing beamsplitter 272, the upper surface 284 of the LCE 270 and then by the reflecting surface 285.

The main drawback of the embodiment illustrated in FIG. 25 is that since the focal length of the converging lenses 124 and 280 cannot be identical, the images from the LCEs 129 and 270 are different. FIG. 26 illustrates a modified configuration wherein two different converging lenses are utilized in LCE 270. The combined power of the lenses 286 and 288 is designed to be identical to that of reflecting optical element 124. Hence, the images of the two LCEs could now be identical. FIG. 27 illustrates a different modification of the arrangement from that illustrated in FIG. 25. Here, the converging lenses 124 and 280 are replaced by two simple reflecting surfaces 292 and 294 respectively. Two identical collimating lenses 296 and 298 are placed next to the upper major surface to yield an optical system with two identical images 300L and 300R respectively.

FIG. 28 illustrates an optical system wherein the double image 300L and 300R from the LCE 129 and 270 are coupled into two different LOEs, 20L and 20R respectively. As illustrated, the polarizations of images 300L and 300R are p and s respectively. This might be a shortcoming for systems wherein a similar polarization is required from both images.

FIG. 29 illustrates an optical system wherein a half-wavelength retardation plate 301 is inserted between the left LCE 129 and the left LOE 20L to create two identical linearly s-polarized images, 300L and 300R.

Another modified version of the double-image arrangement is illustrated in FIG. 30. Here, the LOEs are inserted between two identical collimating lenses 302L and 302R and a quarter-wavelength retardation plates 304L and 304R, wherein image light waves are collimated and coupled into the LOEs in the same manner described above with reference to FIG. 16. In this couple-in method, it is preferred that the input light waves to the LOEs will be p-polarized. Hence, the half-wavelength retardation plate 301 is now inserted between the right LCE 272 and the right LOE 20R to create two identical linearly p-polarized input waves 300L and 300R. As illustrated in FIG. 31, this optical arrangement could be assembled inside a spectacles frame 305, to create an optical device wherein the same image is projected for both eyes 24L and 24R by utilizing only one display light source 112, which is located between the two glasses. Usually, the nose-bridge of a conventional spectacles frame is located a few millimeters above the eyes.

FIG. 32 illustrates a method to insert the images into the eyes of the user properly. Here, the center of the display light source 112 is located slightly above the centers of the collimating lenses 302L and 302R, which are located slightly above the centers of the eyes 24L and 24R. As a result, the images are projected into the eyes wherein the major axes of the images is inclined a few degrees above the horizon. As illustrated in FIGS. 31 and 32, the optical module, which can be added to any conventional frame, could be very compact and lightweight, with no disturbance to the user.

In all the optical systems which were described above in relation to FIGS. 25 to 32, the LCEs collimate unpolarized light waves. Nevertheless, microdisplays such as LCD or LCOS, where the emerging light is linearly polarized, might also be utilized as the display light source. This can be done by rotating the linear polarization of the light waves of the display light source by 45° or by converting it into a circular polarization.

In all the optical systems which were described above in relation to FIGS. 1 to 32, the LCE operates as a collimator. That is, a real image from a display light source is focused to infinity. In addition, the main purpose for materializing the LCE was to create collimating light waves as the input for an LOE based optical system. Clearly, an LCE device could be utilized for different optical operations and many other applications. That is, the LCE can focus an image to a different distance than infinity and can be inserted in other systems wherein it is desired to achieve good performance and keep a compact and light-weight system.

FIG. 33 illustrates an optical system wherein the LCE performs as a focusing lens for a camera. Here the p-polarized component of the input wave 306 from an external scene passes through upper surface 307 of the LCE 129 and through the polarizing beamsplitter 308. It is then reflected, converged and changed to s-polarized light by the retardation plate 310 and a focusing lens 312 having a reflective back surface 314. It is then reflected by the polarizing beamsplitter 308, the lower surface 316 of the LCE 129 and then by the reflecting surface 318. The converging light wave exits the LCE through the lower surface 318 and is then focused onto the detector plane 320. A focus mechanism might be added to this device by enabling a lateral translation of the camera or of the focusing lens along the z-axis in relation to the lower plane 316.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical system comprising:
a first light-transmitting substrate having at least one major surface and edges;
a display light source;
a coupling optical element carried by said substrate, such that light waves from said display source are coupled by said coupling optical element into said substrate by total internal reflection;
at least one polarizing beam-splitter carried by said substrate, at least one reflecting optical element, and at least one retardation plate;
wherein said retardation plate is located between at least a portion of the major surface of the substrate and said reflecting optical element and wherein said polarizing beam-splitter reflects light waves which are coupled inside the substrate into said reflecting optical element;
a second light-transmitting substrate having at least two major surfaces parallel to each other and two edges;
a second optical element for coupling light into said substrate by internal reflection; and
at least one partially reflecting surface located in said substrate, which surface is non-parallel to the major surfaces of said second substrate, wherein said second substrate is positioned adjacent to said first substrate.

2. The optical system according to claim 1, wherein optical waves which are coupled out of said first substrate are coupled by said second optical element into said second substrate by total internal reflection.

3. The optical system according to claim 1, wherein said second optical element for coupling light is embedded inside said second light-transmitting substrate.

4. The optical system according to claim 1, wherein said second optical element for coupling light is a polarizing beamsplitter.

5. The optical system according to claim 1, wherein said second substrate is positioned between said first substrate and said reflecting optical element.

6. The optical system according to claim 5, wherein a retardation plate is positioned between said second substrate and said reflecting optical element.

7. The optical system according to claim 5, further comprising a second reflecting optical element which is positioned adjacent to one of the major surfaces of said second substrate.

8. The optical system according to claim 1, wherein said first and second light-transmitting substrates are optically attached.

9. The optical system according to claim 1, wherein an angular sensitive coating is applied to at least one major surface of said light-transmitting substrates.

10. The optical system according to claim 1, further comprising:
a third light-transmitting substrate having at least two major surfaces parallel to each other and two edges;
third optical element for coupling light into said third substrate by internal reflection, and
at least one partially reflecting surface located in said third substrate, which surface is non-parallel to the major surfaces of said third substrate,
wherein said third substrate is positioned adjacent to said first substrate.

11. The optical system according to claim 10, wherein image waves which are coupled out of the first substrate are coupled into said second and third substrates by total internal reflection.

12. An optical system, comprising:
a first light-transmitting substrate having at least one major surface and edges;
a display light source;
at least one polarizing beam-splitter carried by said substrate, at least one reflecting optical element, and at least one retardation plate,
wherein said retardation plate is located between at least a portion of the major surface of the substrate and said reflecting optical element and wherein said polarizing beam-splitter reflects light waves which are coupled inside the substrate into said reflecting optical element;
a second light-transmitting substrate having at least two major surfaces parallel to each other and two edges; and
at least one partially reflecting surface located in said substrate, which surface is non-parallel to the major surfaces of said second substrate, wherein said second substrate is positioned adjacent to said first substrate,
wherein said first and second light-transmitting substrates are optically attached;
characterized by at least one coupling optical element carried by said substrates, such that light waves from said display source are coupled by said coupling optical element into said substrates by total internal reflection.

13. The optical system according to claim 12, wherein said reflecting optical element is not parallel to any of the edges of said substrate.

14. The optical system according to claim 12, wherein said light waves are linearly polarized.

15. The optical system according to claim 12, wherein said display light source is positioned adjacent to one of the major surfaces of said substrate.

16. The optical system according to claim 12, wherein said retardation plate is a quarter-wavelength plate.

17. The optical system according to claim 16, wherein said reflecting optical element is optically attached to said quarter-wave retardation plate.

18. The optical system according to claim 12, wherein said reflecting optical element is an imaging lens.

19. The optical system according to claim 18, wherein said reflecting optical element includes two surfaces, a first of said surfaces is transparent and a second is coated with a reflecting material.

20. The optical system according to claim 19, wherein said retardation plate is positioned between said first transparent surface and one of the major surfaces of said substrate.

21. The optical system according to claim 12, wherein said optical element for coupling light reflects s-polarized light and transmits p-polarized light.

22. The optical system according to claim 12, wherein said optical element for coupling light reflects p-polarized light and transmits s-polarized light.

23. The optical system according to claim 12, wherein said reflecting optical element and the retardation plate are positioned adjacent to said coupling optical element.

24. The optical system according to claim 12, wherein said reflecting optical element is a collimating lens.

25. The optical system according to claim 12, further comprising a light source.

26. The optical system according to claim 25, wherein said light source is positioned adjacent to one of the major surfaces of said light-transmitting substrate.

27. The optical system according to claim 12, further comprising a second polarizing beam-splitter carried by said light-transmitting substrate.

28. The optical system according to claim 27, wherein said second polarizing beam-splitter is parallel to said optical element.

29. The optical system according to claim 12, further comprising a second reflecting optical element.

30. The optical system according to claim 29, wherein said second reflecting optical element is positioned adjacent to one of the major surfaces of the first light-transmitting substrate.

31. The optical system according to claim 29, wherein a retardation plate is positioned between said second reflecting optical element and said major surface of the substrate.

32. The optical system according to claim 12, wherein an angular sensitive coating is applied to at least one major surface of said substrate.

33. The optical system according to claim 12, further comprising at least one transparent plate positioned adjacent to at least one major surface of said substrates, and wherein said transparent plate is coated with an angular sensitive coating.

34. The optical system according to claim 12, wherein said image light waves are split by said optical element into two separate images.

35. The optical system according to claim 34, wherein said two images are coupled out of said substrate.

36. The optical system according to claim 12, further comprising a second reflecting optical element positioned between the display light source and one of the major surfaces of the substrate.

* * * * *